F. MARTIN.
ANTISKID CHAIN HOLDER FOR VEHICLE WHEELS.
APPLICATION FILED MAR. 13, 1918.
1,287,384.
Patented Dec. 10, 1918.
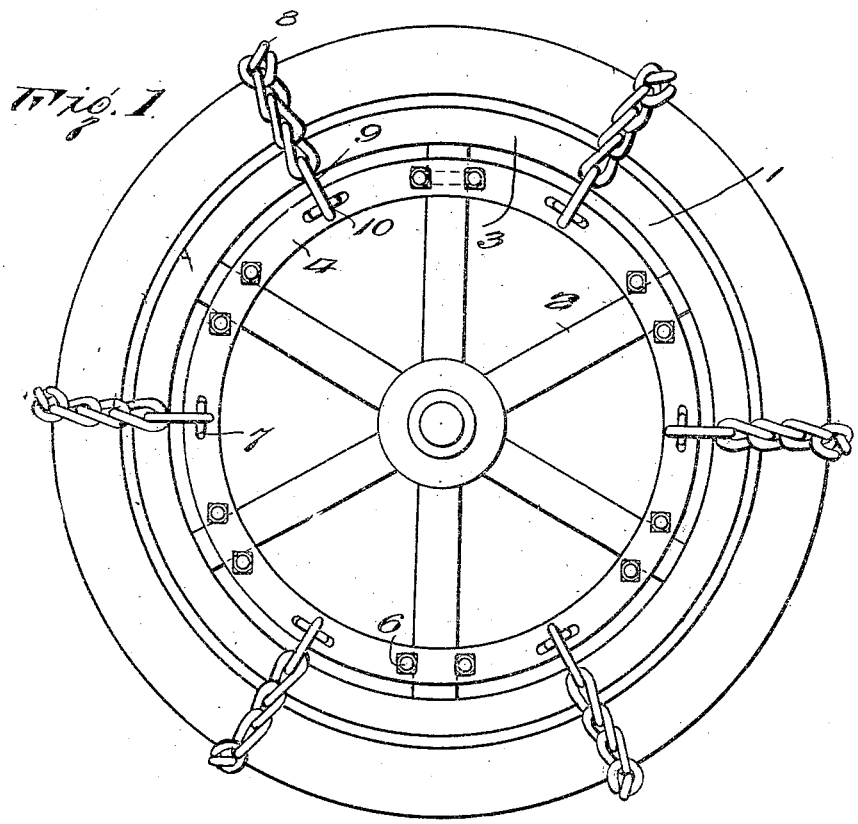
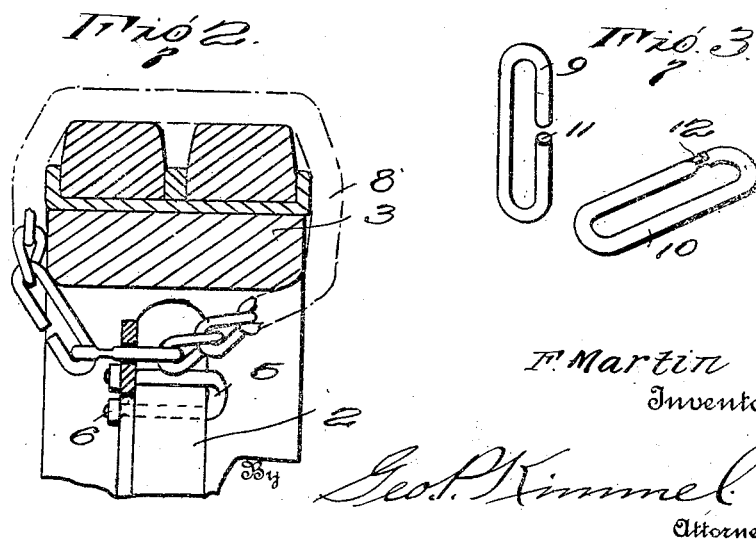
F. Martin
Inventor
By Geo. P. Kimmel
Attorney

UNITED STATES PATENT OFFICE.

FRED MARTIN, OF STONEHAM, MASSACHUSETTS.

ANTISKID-CHAIN HOLDER FOR VEHICLE-WHEELS.

1,287,384.  Specification of Letters Patent.  Patented Dec. 10, 1918.

Application filed March 13, 1918. Serial No. 222,113.

*To all whom it may concern:*

Be it known that I, FRED MARTIN, a citizen of the United States, residing at Stoneham, in the county of Middlesex and State of Massachusetts, have invented certain new and useful Improvements in Anti-Skid-Chain Holders for Vehicle-Wheels, of which the following is a specification.

This invention relates to new and useful improvements in anti-skid devices for vehicle wheels, and the primary object of the invention is to provide a holding means for anti-skid chains, that are disposed transversely across the periphery of the vehicle wheel, said means embodying a simple construction, adapted to securely hold the chains in position on the vehicle wheel, and prevent any possibility of their accidental disengagement.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:

Figure 1 is a side elevation of a vehicle wheel showing my attachment applied thereto, Fig. 2 is a transverse section through a portion of the rim of the wheel showing the arrangement of the anti-skid device and securing ring thereon, and Fig. 3 is a detail perspective view of the connecting links of the anti-skid chains.

In describing my invention, I shall refer to the drawings in which similar reference characters designate corresponding parts throughout the several views.

The numeral 1 designates a vehicle wheel, which in the accompanying drawings is shown as comprising a truck wheel, said wheel being provided with the usual spokes 2, and periphery 3 or rim portion secured to the extremities thereof.

The holding means employed in this device comprises a flat ring 4 which is positioned at one side of the wheel and rests against the spokes adjacent the outer extremities thereof. This ring is closely positioned beneath the rim and is held in position by a plurality of U-bolts 5, which are positioned around the spokes, and through openings in the ring, the ends of the bolts being securely held in position by fastening nuts 6 thereon. This connection is clearly shown in Fig. 2 of the drawings and will serve to securely hold the ring into engagement with the spokes of the wheel. The ring is provided with a plurality of circumferentially spaced elongated slots 7 therein for a purpose to be hereinafter more fully described. These slots are positioned so that they will come between the spokes as clearly shown in the accompanying drawings.

The anti-skid devices adapted to be connected by a holding ring, comprise a plurality of chains 8 which are adapted to extend transversely across the periphery of the wheel in circumferentially spaced relation, and the ends thereof overlap the sides of the periphery and are adapted to be connected by a pair of enlarged releasable links 9 and 10. The link 9 is split as shown at 11 and the same is adapted for engagement with the link 10 as said link has a flattened portion 12 through which the split portion of the link 9 is adapted to enter. This will securely connect the chains beneath the periphery or rim of the wheel, and in operation one of the links, preferably the link 10 is positioned through an adjacent slot 7 in the holding ring and connected with the split link 9 whereby the chains will be securely held in position as is clearly illustrated.

Any number of anti-skid chains may be employed according to the number of slots in the holding ring. The link 10 is preferably positioned through the slot 7 in the ring 4, and is then adapted for engagement with the link 9 as has been fully described. This connection will be sufficient to securely hold the chains transversely across the periphery or rim of the wheel, and prevent any possibility of accidental disengagement. The ring 4 may be secured rigidly to the wheel at all times and renders a means for easily securing the anti-skid chains in position when needed. This type of holder is very simple in construction, but has been found very efficient and durable in operation. It does not employ any complicated construction, and any short length chain of the size desired may be employed as long as the ends are connected by the releasable links described.

From the foregoing description, taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having fully described my invention, what I claim is new, and desire to secure by Letters Patent, is:

1. In combination with a vehicle wheel, anti-skid means arranged over the tread portion thereof, pairs of releasable links connecting the ends of said anti-skid means beneath the periphery of the wheel, a retaining ring secured to the spokes of said wheel, said ring being formed with a plurality of circumferentially disposed slots adapted to receive one of the connecting links of each of said anti-skid means.

2. The combination with a vehicle wheel, a plurality of anti-skid chains adapted to be disposed transversely across the periphery of said wheel in circumferentially spaced relation, a pair of releasable links connecting the free ends of each chain beneath the periphery of the wheel, a holding ring secured to the spokes of said wheel, and said ring being provided with a plurality of circumferentially spaced slots adapted to receive one of the connecting links of each chain.

In testimony whereof, I affix my signature hereto.

FRED MARTIN.